(12) United States Patent
Bao et al.

(10) Patent No.: US 9,549,079 B2
(45) Date of Patent: Jan. 17, 2017

(54) ACOUSTIC ECHO CANCELLATION FOR MICROPHONE ARRAY WITH DYNAMICALLY CHANGING BEAM FORMING

(71) Applicant: Cisco Technology, Inc., San Jose, CA (US)

(72) Inventors: Feng Bao, Sunnyvale, CA (US); Subrahmanyam Venkata Kunapuli, Fremont, CA (US); Fei Yang, San Jose, CA (US); Xiangyu Bao, Campbell, CA (US); Tor A. Sundsbarm, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 632 days.

(21) Appl. No.: 14/018,635

(22) Filed: Sep. 5, 2013

(65) Prior Publication Data
US 2015/0063579 A1  Mar. 5, 2015

(51) Int. Cl.
  *H04M 9/08* (2006.01)
  *G10K 11/34* (2006.01)

(52) U.S. Cl.
  CPC ............ *H04M 9/082* (2013.01); *G10K 11/346* (2013.01)

(58) Field of Classification Search
  CPC .................................................. H04M 9/082
  USPC .................. 379/88.01–88.19, 406.01–406.16
  See application file for complete search history.

(56) References Cited

U.S. PATENT DOCUMENTS

| | | | |
|---|---|---|---|
| 7,003,099 B1 * | 2/2006 | Zhang | H04M 9/082 379/388.02 |
| 8,184,801 B1 | 5/2012 | Hamalainen | |
| 8,385,557 B2 * | 2/2013 | Tashev | H04M 9/082 379/406.01 |
| 2005/0281415 A1 * | 12/2005 | Lambert | H04R 3/005 381/92 |
| 2006/0008076 A1 * | 1/2006 | Okumura | H04R 3/02 379/406.01 |

(Continued)

OTHER PUBLICATIONS

Kellermann, "Strategies for Combining Acoustic Echo Cancellation and Adaptive Beamforming Microphone Arrays," 1997 IEEE International Conference on Acoustics, Speech, and Signal Processing (ICASSP-97), Apr. 1997, pp. 219-222.

(Continued)

*Primary Examiner* — Solomon Bezuayehu
(74) *Attorney, Agent, or Firm* — Edell, Shapiro & Finnan, LLC (57) ABSTRACT

Acoustic echo cancellation is improved by receiving a speaker signal that is used to produce audio in a room, and receiving audio signals that capture audio from an array of microphones in the room, including an acoustic echo from the speakers. To cancel the acoustic echo, one adaptive filter is associated with a corresponding subspace in the room. Each of the audio signals is assigned to at least one of the adaptive filters, and a set of coefficients is iteratively determined for each of the adaptive filters. The coefficients for an adaptive filter are determined by selecting each of the audio signals assigned to that adaptive filter and adapting the filter to remove an acoustic echo from each of the selected audio signals. At each iteration, a different audio signal is selected from the audio signals assigned to the adaptive filter in order to determine the set of coefficients.

18 Claims, 8 Drawing Sheets

(56) References Cited

U.S. PATENT DOCUMENTS

| | | | | |
|---|---|---|---|---|
| 2006/0153360 A1* | 7/2006 | Kellermann | .......... | H04M 9/082 |
| | | | | 379/406.08 |
| 2007/0036344 A1* | 2/2007 | Lin | .......... | H04M 9/082 |
| | | | | 379/406.08 |
| 2007/0263850 A1* | 11/2007 | Stokes | .......... | H04M 9/082 |
| | | | | 379/406.01 |
| 2008/0107281 A1* | 5/2008 | Togami | .......... | H04M 9/082 |
| | | | | 381/66 |
| 2008/0317254 A1* | 12/2008 | Kano | .......... | G10K 11/1786 |
| | | | | 381/71.4 |
| 2009/0262950 A1* | 10/2009 | Farhang | .......... | H04R 3/005 |
| | | | | 381/66 |
| 2013/0170660 A1* | 7/2013 | Kristensen | .......... | H04R 25/305 |
| | | | | 381/60 |

OTHER PUBLICATIONS

Hämäläinen, et al., "Acoustic Echo Cancellation for Dynamically Steered Microphone Array Systems," 2007 IEEE Workshop on Applications of Signal Processing to Audio and Acoustics, Oct. 21-24, 2007, pp. 58-61.

Kellermann, "Integrating Acoustic Echo Cancellation with Adaptive Beamforming Microphone Arrays," Invited lecture at Forum Acusticum (integrating 137th ASA meeting, 2nd EAA convention, 25th DAGA conference), Berlin, Mar. 14-19, 1999, pp. 1-4.

Martin, et al., "Acoustic Echo Cancellation for Microphone Arrays Using Switched Coefficient Vectors," 1995 International Conference on Acoustics, Speech, and Signal Processing (ICASSP-95), May 1995, pp. 85-88.

* cited by examiner

ACOUSTIC ECHO CANCELLATION FOR MICROPHONE ARRAY WITH DYNAMICALLY CHANGING BEAM FORMING

TECHNICAL FIELD

The present disclosure relates to audio processing to remove acoustic echo.

BACKGROUND

Acoustic echo cancellation (AEC) is widely used in teleconference systems. Array microphones are becoming more popular with advances in audio technology. When AEC is applied to array microphones, either an adaptive filter is applied for each microphone in the array, or one adaptive filter is used at the output of the entire array. Adaptive filters require high computation power, and when the number of microphones in the array is large, the processing requirements for AEC can be prohibitively high to accommodate the one adaptive filter per microphone approach.

In order to pick up sound sources from different locations in the room, an array microphone has to dynamically change its beam steering angle. If only one adaptive filter is used for the output of an array microphone, then the adaptive filter adapted for the previous steering angle will not be able to perform AEC well for the current angle. When there is a large difference between the previous steering angle and the current steering angle, the adaptive filter may add more echo instead of cancelling it, or the filter may even become unstable.

DESCRIPTION OF EXAMPLE EMBODIMENTS

Overview

Techniques are presented herein to improve acoustic echo cancellation by receiving a speaker signal that is used to produce audio in a room, and receiving audio signals that capture audio from an array of microphones in the room, including an acoustic echo from the speakers. To cancel the acoustic echo, a computing device associates a plurality of adaptive filters to a corresponding plurality of subspaces in the room, with each of the adaptive filters associated with one subspace. Each of the audio signals is assigned to at least one of the adaptive filters, and a set of coefficients is iteratively determined for each of the adaptive filters. The coefficients for an adaptive filter are determined by selecting each of the audio signals assigned to that adaptive filter and adapting the filter to remove an acoustic echo from each of the selected audio signal. At each iteration, a different audio signal is selected from the audio signals assigned to the adaptive filter in order to determine the set of coefficients. For example, a first audio signal is selected from the plurality of audio signals, and a first coefficient from the set of coefficients for the first adaptive filter. An echo cancelled microphone signal is produced using the first audio signal and the first coefficient of the first adaptive filter.

Example Embodiments

Acoustic Echo Cancellation (AEC) is the process of removing an echo generated by loudspeakers (simply referred to as "speakers") in the vicinity of microphones. AEC works by comparing the signal received from the microphone with the signal sent to the speaker, and removing the signal that was sent to the speaker from the signal received from the microphone. Adaptive filters are used to adjust to changing room acoustics, but the filters require a significant amount of computational power. As the number of microphones M used in a deployment, e.g., a conference room, increases, the computational requirements for maintaining one adaptive filter per microphone becomes too large. In order to optimize the computational power requirement with AEC performance, a room is divided into N subspaces, where N is much less than M, with each subspace assigned a single adaptive filter.

Figure 1:
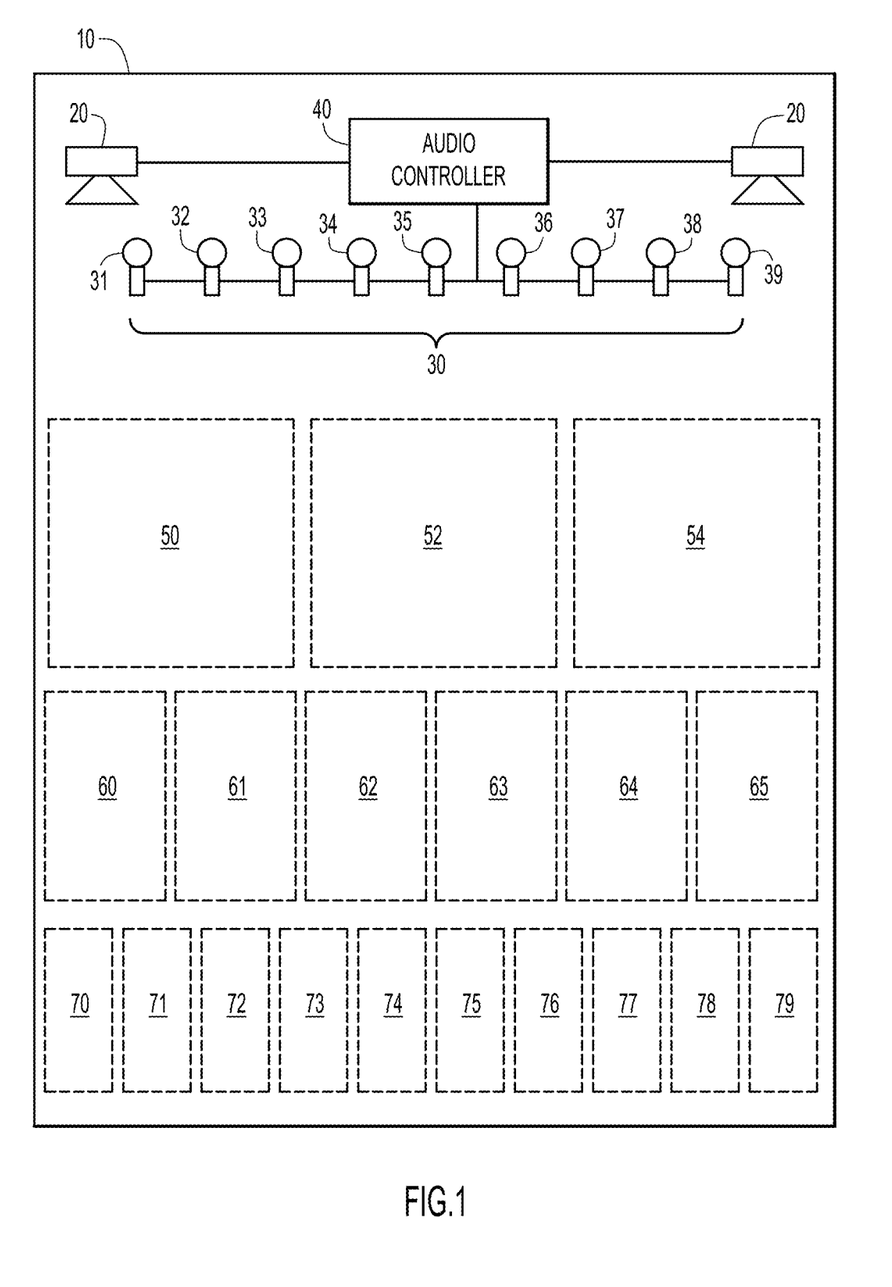
FIG. 1 is a diagram of a conference room with an array microphone capable of dynamic beam steering and acoustic echo cancellation.

Referring now to FIG. 1, a conference room 10 is shown with speakers 20 to produce audio output into the room 10, and microphone array 30 to capture audio produced in the room. Microphone array 30 includes microphones 31-39, but any number or configuration of microphones may be used in the microphone array 30. As a general example, microphone array 30 comprises M microphones that can be configured to provide a plurality of audio beams that cover conference room 10. Audio controller 40 is coupled to speakers 20 and microphone array 30 and controls the audio in conference room 10.

Audio beams are formed by combining the signals from some or all of the microphones with variable delays such that an audio beam captures audio from a specific area. For example, simply adding the outputs of two microphones forms an audio beam that points 90° from the midpoint between the two microphones. An audio beam from two microphones is able to increase the signal-to-noise ratio (SNR) by up to 3 dB, which allows sound to be picked up from about 40% further than from a single microphone. Delaying one of the two microphone signals before the summation points the beam to the left or to the right. As the number of microphones used to form an audio beam increases, the width of the audio beam decreases and the range increases.

The physical space of conference room 10 is divided into a plurality of subspaces 50-79. In this example, subspaces 50, 52, and 54 cover the front of the room 10 near the microphones and speakers, subspaces 60-65 cover the middle of the room, and subspaces 70-79 cover the back of the room. Audio from the front subspaces 50, 52, and 54 may each be captured by a microphone that is closest to each of the front subspaces. In other words, any of microphones 31, 32 or 33 may provide audio that covers subspace 50, microphones 34, 35, or 36 may provide audio that covers subspace 52, and microphones 37, 38, or 39 may provide audio that covers subspace 54. Audio beams from combinations of two microphones may also provide some audio for the front subspaces 50, 52, or 54.

Referring again to FIG. 1, audio beams from combinations of a small number of microphones (e.g., up to 4 or 5 microphones) provide audio from subspaces 60-65. For example, multiple audio beams with certain relative delays between the signals of microphones 31, 32, and 33 may be provided to cover subspace 60. Subspace 61 may be covered by multiple audio beams from combinations of microphones 31, 32, and 33 using different relative delays. Similarly, audio beams formed from the signals of microphones 34, 35, and 36 may provide audio for subspaces 62 and 63, and audio beams from microphones 37, 38, and 39 may provide audio for subspaces 64 and 65. Finally, for this example, audio beams formed from combinations of all nine microphones 31-39 provide audio from subspaces 70-79 in the back of the room. Since audio beams become narrower as more microphone signals are combined to reach longer distances, more audio beams are needed to cover the back of the room. Consequently, there are more, smaller subspaces 70-79 covering the back of the room compared to the fewer, larger subspaces 50, 52, and 54 that cover the front of the room in this example.

Other configurations of subspaces are envisioned depending on the acoustics of the room, and the number and placement of the microphones and speakers. The number N and configuration of the subspaces may change with changing room acoustics, such as when a person stands up, blocking one of the microphones.

Figure 2:
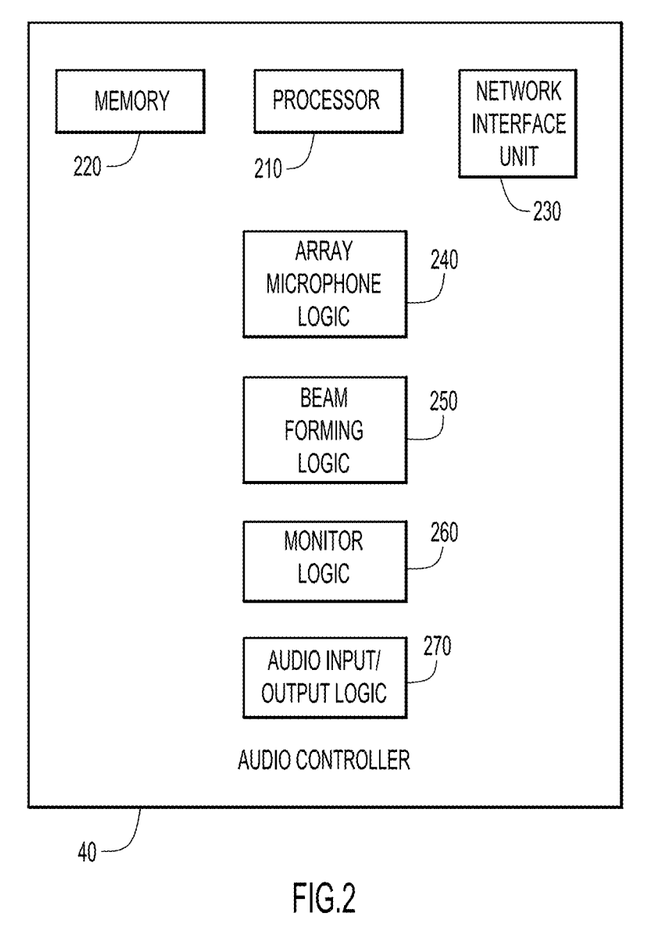
FIG. 2 is a block diagram of a computing device that controls the audio for the conference room in accordance with the techniques presented herein.

Referring now to FIG. 2, a block diagram of the functional blocks of audio controller 40 is described. Controller 40 includes a processor 210, memory 220, an optional network interface unit 230, array microphone logic 240, beam forming logic 250, monitor logic 260, and audio input/output logic 270. Processor 210 may comprise one or a plurality of processors and is configured to control operations of controller 40. Processor 210 may execute one or more software programs stored in memory 220. Data representing audio and adaptive filter coefficients may also be stored in memory 220. The functional blocks 240-270 of controller 40 may be embodied by dedicated or combined application specific integrated circuits (ASICs) containing digital logic. Alternatively, one or more of the functional blocks 240-250 may be embodied by software stored in memory 220 and executed by processor 210.

Memory 220 may comprise read only memory (ROM), random access memory (RAM), magnetic disk storage media devices, optical storage media devices, flash memory devices, electrical, optical, or other physical/tangible memory storage devices. The processor 210 is, for example, a microprocessor or microcontroller that executes instructions for any of the logic described in controller 40. Thus, in general, the memory 220 may comprise one or more tangible (non-transitory) computer readable storage media (e.g., a memory device) encoded with software comprising computer executable instructions and when the software is executed (by the processor 210) it is operable to perform the operations described herein.

Network interface unit 230 may be used to communicate with outside devices. For example, controller 40 communicates with other controllers in other conference rooms when the conference rooms are used for Telepresence meetings. Controller 40 may also coordinate with portable devices within conference room 10 to send and receive audio, such as in a Bring Your Own Device (BYOD) environment.

In operation, array microphone logic 240 receives audio beams from beam forming logic 250 and removes any acoustic echo present in the audio beams using an adaptive filter. For each subspace, one or more audio beams are used to determine a set of coefficients for an adaptive filter. The set of coefficients for an adaptive filter comprises coefficients, each of which is associated with a particular audio beam among a plurality of audio beams, that causes the adaptive filter to best remove any acoustic echo in that particular audio beam. A coefficient for a particular audio beam for a particular adaptive filter may comprise more than one actual coefficient, but will be described herein as a single coefficient. While the adaptive filter converges on the best coefficient for only one of the audio beams at a time, the performance of the adaptive filter on the other audio beams is monitored by monitor logic 260. The functions of array microphone logic 240 will be described in more detail with respect to FIGS. 4, 5, 7, and 8. Audio input/output logic 270 controls the input of audio from array microphone 30 (e.g., analog-to-digital conversion, etc.) and output to speaker 20.

Figure 3:
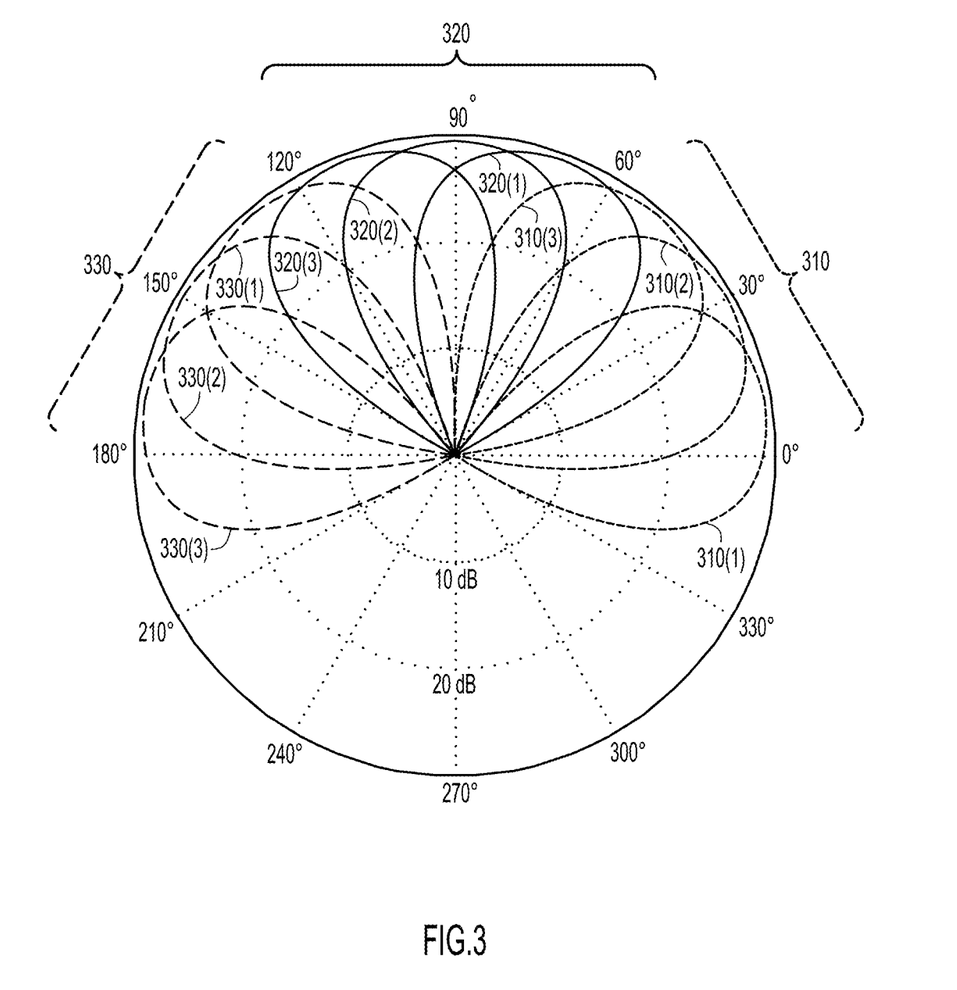
FIG. 3 is a diagram illustrating one example of audio subspaces.

Referring now to FIG. 3, an example of dividing an acoustic space by steering angle is described. In this example, all of the microphones are used to capture audio in a 180° angle from a central point. As a general example, the space is divided into N subspaces with K audio beams in each subspace. In this specific example (N=3, K=3), there are three subspaces 310, 320, and 330 with each subspace having three audio beams assigned to each subspace. Audio beams 310(1), 310(2), and 310(3) are assigned to subspace 310. Audio beams 320(1), 320(2), and 320(3) are assigned to subspace 320. Audio beams 330(1), 330(2), and 330(3) are assigned to subspace 330. This configuration of audio beams at 10°+k*20°, where k=0, 1, 2, . . . , 8 covers three subspaces centered at 30°, 90°, and 150°, with three beams equally spaced in each subspace. In this example, each individual audio beam covers a relatively narrow angle of 60° before the signal strength drops 10 dB, which would result in unacceptably poor audio quality. By overlapping the relatively narrow audio beams, the entire 180° space is covered, and no angle has more than a 2 dB loss. This ensures that good quality audio can be captured from any angle with the proper choice of audio beam.

In the example shown in FIG. 3, subspace 310 comprises the right side of the room, subspace 320 comprises the center of the room, and subspace 330 comprises the left side of the room. These subspaces may overlap to some degree, as long as the acoustic echo path for any audio beam in each subspace is similar enough. Audio beams in one subspace will have similar acoustic echo paths such that adequate AEC can be achieved with a filter adapted to any of the audio beams in the subspace. As will be described below, each subspace 310, 320, and 330 is assigned one adaptive filter. That adaptive filter is responsible for removing the acoustic echo in any of the audio beam in its subspace.

Figure 4:
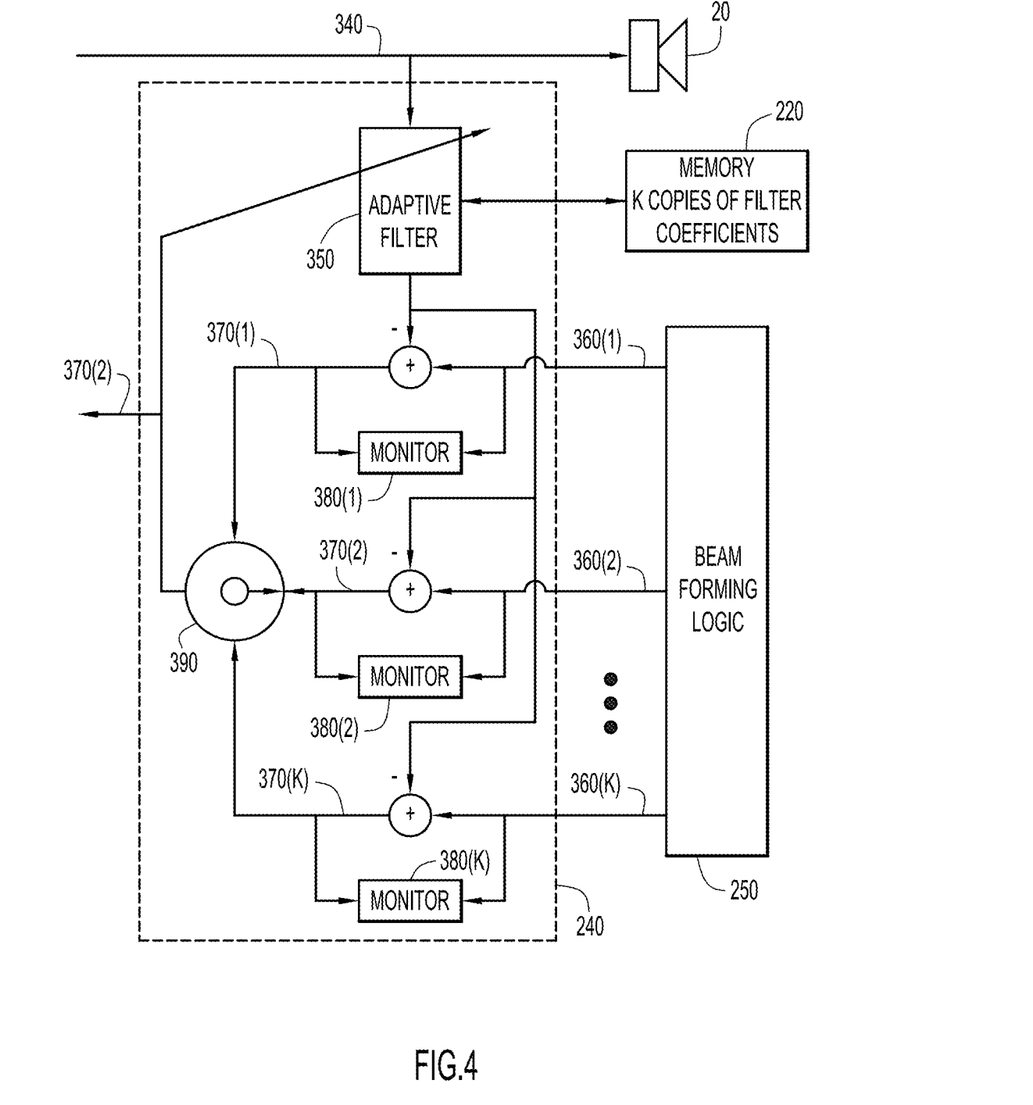
FIG. 4 is a block diagram of one adaptive filter corresponding to one subspace.

Referring now to FIG. 4, the functions of controller 40, and specifically array microphone logic 240, with respect to a single subspace, are described. Speaker signal 340 is provided to speaker 20 and to the adaptive filter 350 in array microphone logic 240. Beam forming logic 250 provides signals for audio beams 360(1), 360(2), . . . , 360(K) to array microphone logic 240, where each audio beam has the output of adaptive filter 350 subtracted to produce echo cancelled microphone signals 370(1), 370(2), . . . , 370(K), respectively. Each of the echo cancelled signals is monitored by a respective instance of monitor logic 260. Specifically, monitors 380(1), 380(2), . . . , 380(K) compare echo cancelled microphone signals 370(1), 370(2), . . . , 370(K) with audio beams 360(1), 360(2), . . . , 360(K), respectively. Selector 390 selects each of the echo cancelled signals from the audio beams in sequence, and applies it to adaptive filter 350 to determine a coefficient that is saved in memory 220.

The following nomenclature is introduced to describe multiple occurrences/instances of elements, such as audio beams, echo cancelled microphone signals, and monitors. Elements with reference numeral having a lower case index i, j, or k (e.g., audio beam 360($i$)) refer to any one of the elements without being specific to which particular element. Any restrictions on the specific element will be explicitly stated with relation to the index, e.g., audio beam 360($i \neq 1$) will refer to any audio beam that is not audio beam 360(1). Elements with a reference numeral having a numerical index refer to a specific element corresponding to the value of that index, e.g., audio beam 360(2) refers to the second audio beam in the collection of audio beams 360. Elements with a reference numeral having an upper case index refer to the last element, e.g., audio beam 360(K) refers to the $k^{th}$ audio beam in a collection of K total audio beams.

In the subspace processed in FIG. 4, K audio beams 360($i$=1 to K) are formed to monitor the AEC performance of adaptive filter 350, although only audio beam 360(2) is used to update filter 350 at the time shown in FIG. 4. Since only one adaptive filter is used in a subspace, regardless of the size of K, monitoring the AEC performance of K beams is achieved with minimal computational power. Once adaptive filter 350 converges for audio beam 360(2), its coefficients are saved, and selector 390 selects a different audio beam 360($j$) to determine the best coefficient for the different audio beam 360($j$). Selector 390 may select the next audio beam in round robin fashion, or it may select an audio beam with poor echo cancellation performance with the previous filter coefficients. For adaptive filter 350, K sets of adaptive filter coefficients corresponding to the K audio beams in the subspace are saved in memory 220 (FIG. 2). Since the acoustic echo path for each of the K audio beams 360($i$) in the subspace is similar, the coefficients for each beam 360($i$) are also similar, if not actually the same. Specifically, the coefficients for any one of the K audio beams 360($i$) should allow adaptive filter 350 to provide adequate AEC for any of the other audio beams 360 ($j \neq i$).

While adaptive filter 350 is converging for audio beam 360(2), all of the monitors 380($i \neq 2$) are monitoring the performance of adaptive filter 350 in removing the echo from their respective audio beams 360($i \neq 2$). If the performance for one of the other audio beams is not adequate, then that audio beam may be moved to a different subspace. The output of array microphone logic 240 is the echo cancelled signal 370(2) of the audio beam 360(2) that is currently selected by selector 390, for the example shown in FIG. 4.

Figure 5:
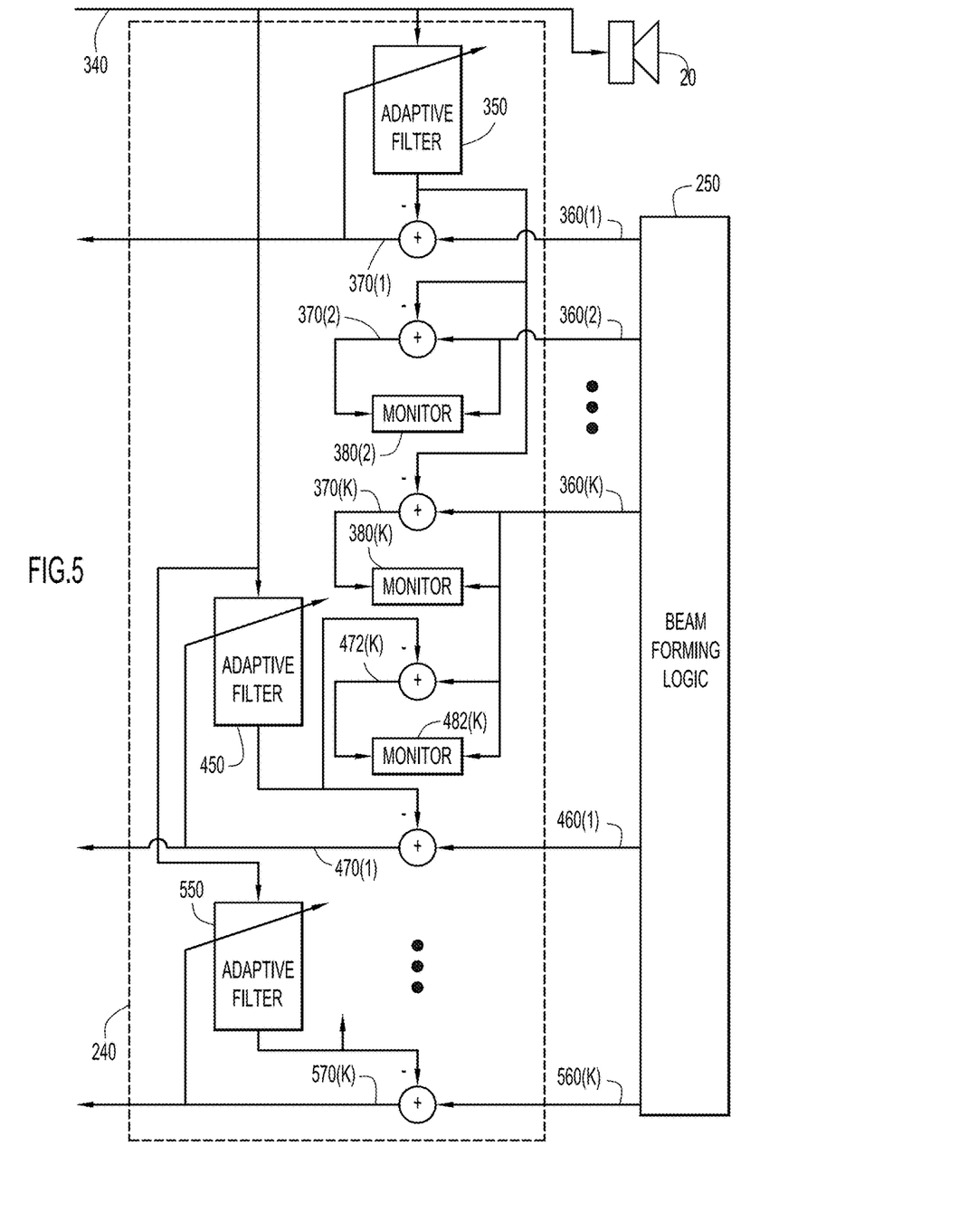
FIG. 5 is a block diagram of multiple adaptive filters and a system for monitoring adjacent subspaces.

Referring now to FIG. 5, more components of array microphone logic 240 are shown, including multiple adaptive filters 350, 450, and 550, each corresponding to a different subspace. Speaker signal 340 is provided to each of the adaptive filters 350, 450, and 550, and beam forming logic 250 provides audio beams for all of the subspaces. Corresponding to adaptive filter 450 are audio beams 460($i$), and echo cancelled signals 470($i$). Similarly, audio beams 560($i$) and echo cancelled signals 570($i$) correspond to adaptive filter 550. While only audio beams 360(1), 360(2), and 360(K) are shown, other audio beams 360($i$) are also provided. Similarly, only audio beams 460(1) and 560(K) are shown in FIG. 5, but other audio beams 460($i$) and 560($i$) are also provided.

FIG. 5 also shows monitor 482(K), which is used to monitor audio beam 360(K) with adaptive filter 450. Echo cancelled signal 472(K) is the result of adaptive filter 450 cancelling any acoustic echo in audio beam 360(K). In the example shown in FIG. 5, audio beam 360(K) is assigned to two subspaces, and echo cancelled signals 370(K) and 472(K) are produced with adaptive filters 350 and 450, respectively. The performance of adaptive filters 350 and 450 are both being monitored with respect to audio beam 360(K) by monitors 380(K) and 482(K), respectively.

The output for array logic 240 in this case may be an echo cancelled signal for each subspace. In an alternative example, the output may be selected from echo cancelled signals corresponding to subspaces with noticeable audio (e.g., somebody is talking in that area). While not all of the echo cancelled signals may be output, all of the audio beams in all of the subspaces are continually cycled through to adapt their respective filters and update the coefficients for each audio beam.

Figure 6:
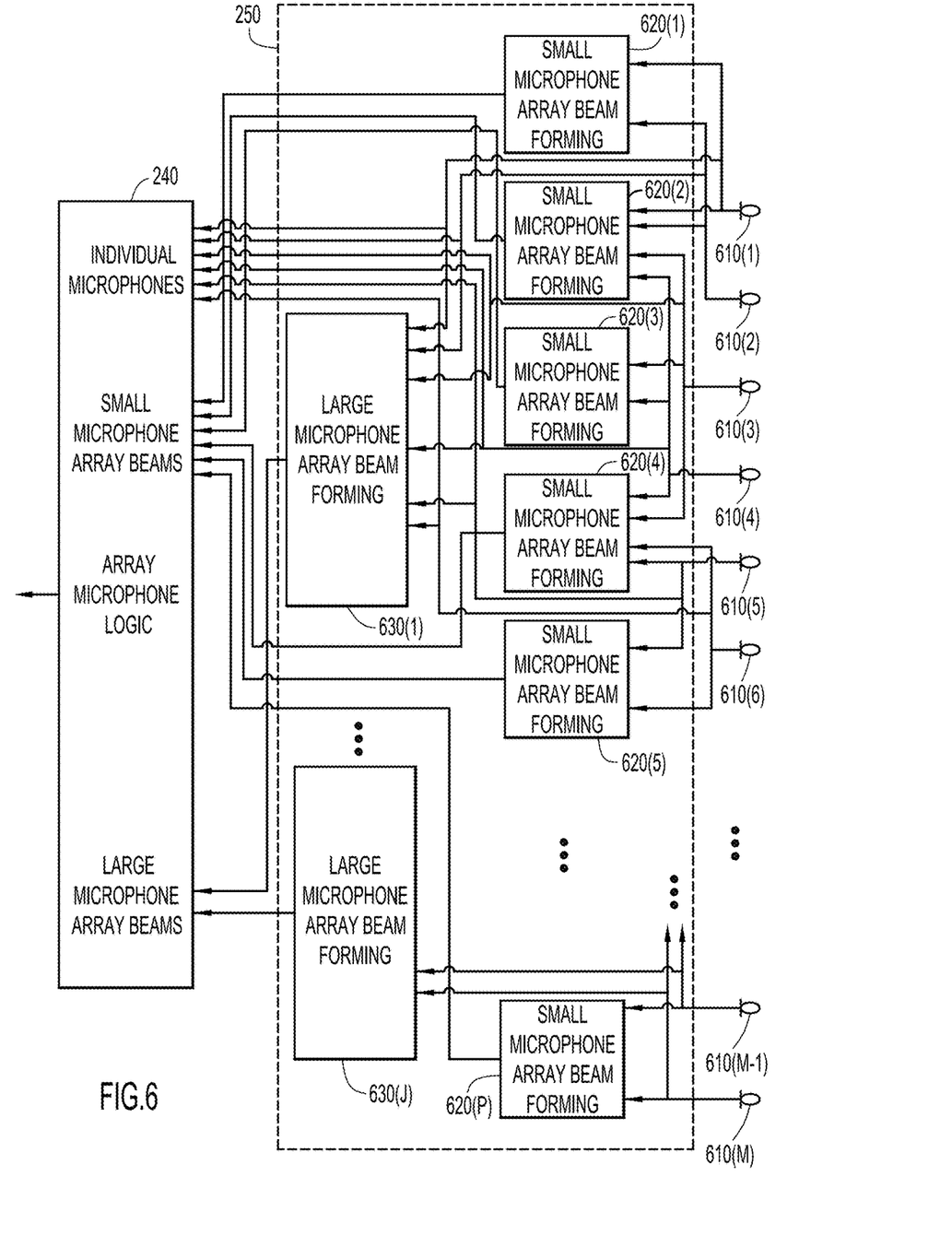
FIG. 6 is a block diagram illustrating one example of beam forming logic.

Referring now to FIG. 6, an example of the beam forming logic 250 is described. Beam forming logic 250 receives input from each of the M microphones 610($i$=1 to M). This input is provided to P instances of small microphone array beam forming logic 620($i$=1 to P). The microphone signals are also provided to J instances of large microphone array beam forming logic 630($i$=1 to J). All of the audio beams formed from beam forming logic 250 are provided to array microphone logic 240, which cancels the acoustic echo as described above.

In the example of FIG. 6, the microphones 610($i$) are divided into microphone groups, and each group may form a beam with a dynamically changing steering angle. The number of microphones may vary from only a single microphone forming its own beam, to small arrays of 2-4 microphones, and large arrays of over 4 microphones. Some microphones may be shared between arrays. For example, small array logic 620(1) creates an audio beam from the signals of microphone 610(1) and 610(2). Small array logic 620(2) creates an audio beam from microphones 610(1), 610(2), 610(3), and 610(4). Small array logic 620(3) creates an audio beam from microphones 610(3), and 610(4). Small array logic 620(4) creates an audio beam from microphones 610(3), 610(4), 610(5), and 610(6). Small array logic 620(5) creates an audio beam from microphones 610(5), and 610(6). Large array logic 630(1) creates an audio beam from microphones 610(1), 610(2), 610(3), 610(4), 610(5), and 610(6).

In one example, an audio beam formed from an individual microphone may be used to capture audio that is relatively close to that microphone, such as subspaces 50, 60, and 70 in FIG. 1. Audio beams formed from small arrays may be used to capture audio that is a medium distance away, such as subspaces 80 and 90. Audio beams formed from large arrays may be used to capture audio that is far away, such as subspace 100.

Figure 7:
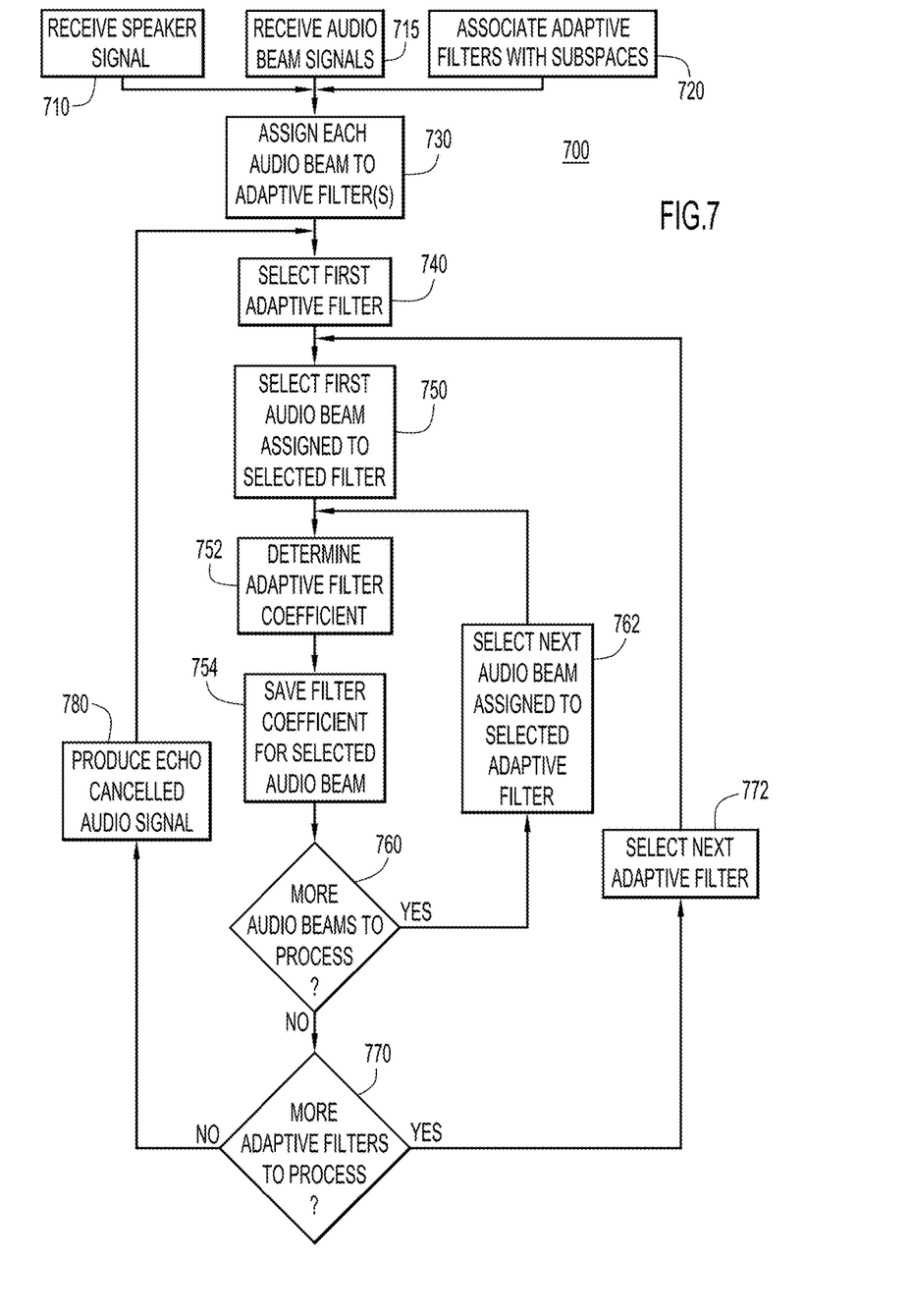
FIG. 7 is a flowchart illustrating an example iterative process of determining filter coefficients for each of the audio beams assigned to each of the subspaces.

Referring now to FIG. 7, with reference to FIGS. 2, 4, and 5, a process 700 is now described for operations of array microphone logic 240 to determine and save the coefficients for a plurality of audio beams in a plurality of subspaces. At step 710, logic 240 receives speaker signal 340. Speaker signal 340 is generated by audio input/output logic 270, and may comprise signals that are locally generated and signals that are received from remote sources through network interface unit 230, as described above. Logic 240 receives a plurality of audio beams from beam forming logic 250 in step 715. At step 720, logic 240 divides the room into a plurality of subspaces and associates an adaptive filter with each of the subspaces in the room. Logic 240 assigns each audio beam to at least one adaptive filter in step 730. An audio beam may be assigned to multiple subspaces/adaptive filters if, for example, the audio beam is directed toward the boundary between two adjacent subspaces.

Logic 240 selects one of the adaptive filters at step 740. In step 750, logic 240 selects one of the audio beams assigned to the selected adaptive filter, and begins to determine the coefficient for the adaptive filter that best cancels the acoustic echo in the selected audio beam. Once the adaptive filter has adapted to best cancel the acoustic echo in the selected audio beam, logic 240 determines the coefficient for the selected audio beam in step 752 and saves the coefficient into memory 220 at step 754. If there are more audio beams assigned to the adaptive filter, then, based on the decision in step 760, logic selects the next audio beam in step 762 and returns to step 752 to determine the coefficient that best cancels the echo in the newly selected audio beam.

The coefficients for the rest of the adaptive filters, if any, as determined in step 770, are found by selecting the next adaptive filter in step 772 and repeating steps 750-762 as described above for the newly selected adaptive filter. An echo cancelled audio signal is produced in step 780 based on the audio beam from the subspace of the room where the desired audio is being produced. The process returns to selecting the first adaptive filter in step 740, and repeats steps 740-772 again to refine the adaptive filter coefficients based on changing acoustic properties of the room. While the above operations have been described such that the coefficients are determined in series for each adaptive filter, these steps may occur in parallel for each adaptive filter. As such, the coefficients for each adaptive filter may be constantly updated even when a particular adaptive filter is not being used to produce output.

Figure 8:
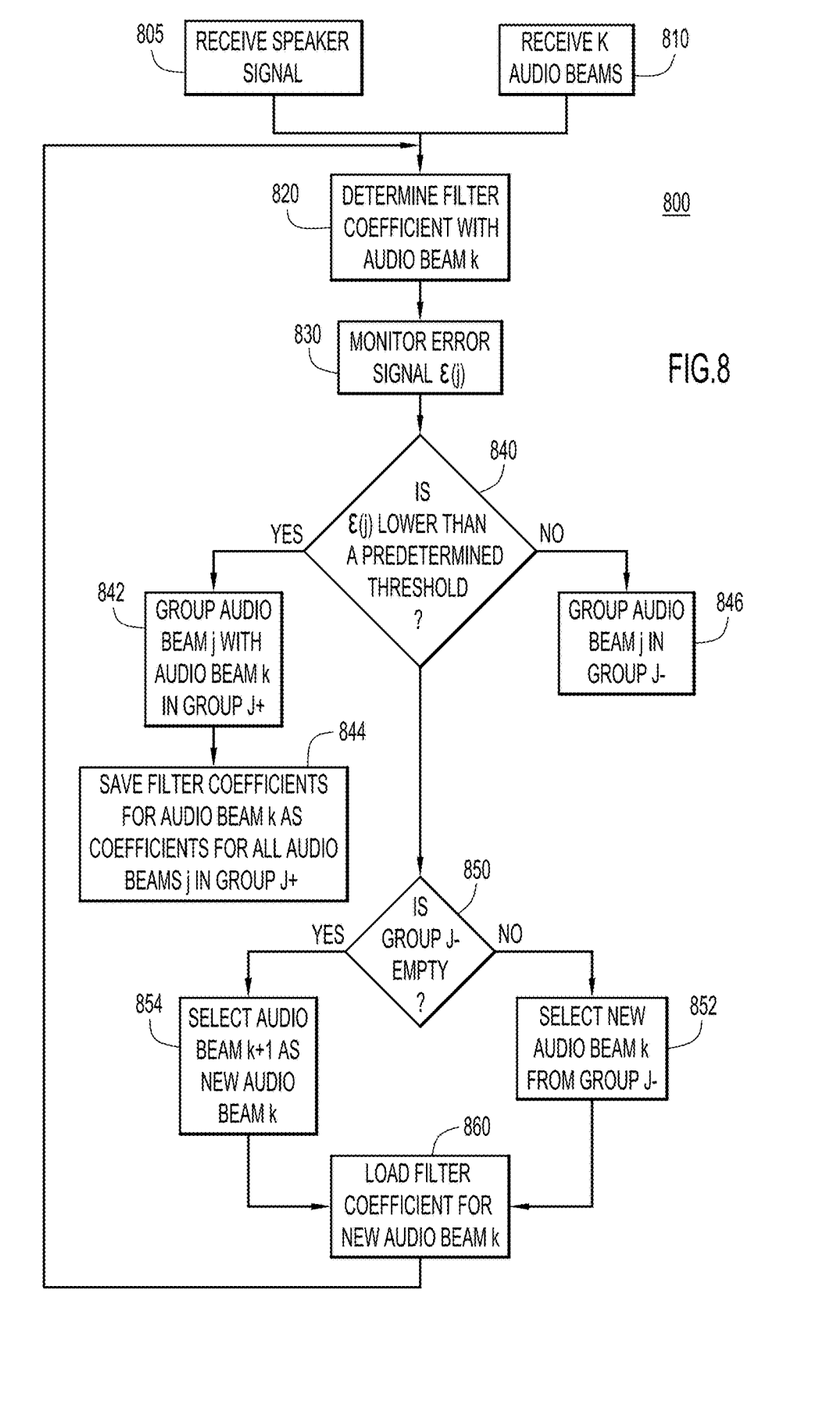
FIG. 8 is a flowchart illustrating an example of the process of determining which audio beams within a single subspace can share the same filter coefficients.

Referring now to FIG. 8, with reference to FIGS. 2 and 4, a process 800 for determining which audio beams 360($i$) in a single subspace can share filter coefficients is described. A speaker signal 340 and K audio beams 360($i$) are received at steps 805 and 810, respectively. Using the speaker signal and a selected audio beam 360($k$), the filter 350 adapts to cancel any acoustic echo in audio beam 360($k$) and determines the best coefficient in step 820.

While the filter adapts to audio beam 360($k$), monitor logic 260 monitors, in step 830, the error signal $\epsilon(j)$ between the adaptive filter output and audio beam 360($j$), where $j=1, 2, \ldots K, j \neq k$. In other words, the performance of the adaptive filter 350, optimized for audio beam 360($k$), is measured against all of the other audio beams 360($j$). If the error signal $\epsilon(j)$ is lower than a predetermined threshold, as determined in step 840, then audio beam 360($j$) is grouped with audio beam 360($k$) into group J+ in step 842, and the coefficient associated with audio beam 360($k$) is saved as the coefficient associated with audio beam 360($j$) in step 844. If the error signal $\epsilon(j)$ is not lower than the predetermined threshold, then audio beam 360($j$) is grouped into group J− in step 846.

After all of the audio beams 360($j$) have been grouped into either group J+ or group J− relative to the selected audio beam 360($k$), it is determined if any audio beams 360($j$) have been grouped into group J−. If group J− is not empty, as determined in step 850, then array microphone logic 240, in step 852, selects an audio beam from the audio beams in group J− to serve as the next audio beam 360($k$). In other words, array microphone logic 240 prepares for the next iteration to determine the coefficient for a new audio beam that may not have sufficient/good echo cancelling performance. If group J− is empty, as determined in step 850, then all of the audio beams 360($i$) have saved coefficients with adequate echo cancellation. In step 854, array microphone logic 240 selects the next audio beam 360($k$+1) for the next iteration as the new audio beam 360($k$). This allows the array microphone logic 240 to refine the saved coefficients in a round robin fashion. In this way, changing room acoustics can be detected and the echo cancelling adaptive filter 350 can adapt to maintain good performance for all of the audio beams in the subspace. In step 860, array microphone logic 240 loads any saved coefficients for the new audio beam 360($k$) that is to be used to adapt filter 350 in the next iteration. Finally, the process loops back to step 820 to begin the next iteration with a new audio beam 360($k$).

In summary, techniques are presented herein to achieve desirable echo cancellation performance, while conserving computation power and memory usage no matter how many microphones are in the array, and how microphones in the array are used. The output of the array can be individual microphone output, audio beams formed by a few microphones in a small microphone array, or audio beams formed by the entire array. While the processes described herein are illustrated with audio beams, these processes may also include other audio signals, such as one or more signals from individual microphones, in place of or in addition to the described audio beams.

One important aspect of the techniques presented herein is to use one filter output to test multiple microphones or small arrays with the same steering angle for echo cancellation performance. If the performance is above a predefined threshold, the filter coefficients can be shared by the individual microphones or small arrays. The similarity between echo paths of different individual microphones and microphone arrays with same steering angle, depends on frequency band and distance between microphones. The smaller the microphone distance, the lower the frequency band, the higher the similarity. Room reverberation is also a factor.

While the shared filter coefficients are not optimized, the filter converges to optimized state much faster starting from the shared filter than from zero coefficients. For each subspace with multiple microphones or small arrays of same steering angle, only one copy of filter coefficients is stored to save storage cost. When one microphone is selected, its AEC starts from the saved filter that has an acceptable performance, and converges to an optimized state with a much faster speed.

Each adaptive filter covers K microphones/beams in a subspace. At any time, the output of the filter is tested against other M microphones/beams of small arrays with same steering angle. If no microphone is blocked, it is possible that all M+1 microphones/small arrays can share the same filter. In that case, it only takes K/(M+1)*T to cover all microphones/beams, while T is convergence time of the filter. The adaptive filter does not need to cover blocked microphones.

In summary, a method is provided comprising: receiving a speaker signal that is used to produce audio in a room; obtaining a plurality of audio beams derived from an array of microphones in the room; associating a plurality of adaptive filters to a corresponding plurality of subspaces in the room, wherein each of the adaptive filters is associated with one subspace; assigning each of the plurality of audio beams to at least one of the associated adaptive filters; iteratively determining a set of coefficients for a first adaptive filter associated with a first subspace by adapting the first adaptive filter to remove an acoustic echo from each of the audio beams assigned to the first adaptive filter; selecting a first audio signal from the plurality of audio signals assigned to the first adaptive filter, and a first coefficient from the set of coefficients for the first adaptive filter; and producing an echo cancelled microphone signal using the first audio signal and the first coefficient of the first adaptive filter.

Similarly, an apparatus is provided comprising: at least one speaker configured to produce audio in a room from a speaker signal; a microphone array comprising a plurality of microphones configured to capture audio, the captured audio comprising an echo of the audio produced by the at least one speaker; and a processor coupled to the at least one speaker and microphone array. The processor is configured to: receive the speaker signal; obtain a plurality of audio signals derived from the microphone array; associate a plurality of adaptive filters to a corresponding plurality of subspaces in the room, wherein each of the adaptive filters is associated with one subspace; assign each of the plurality of audio signals to at least one of the associated adaptive filters; iteratively determine a set of coefficients for a first adaptive filter associated with a first subspace by adapting the first adaptive filter to remove an acoustic echo from each of the audio signals assigned to the first adaptive filter; select a first audio signal from the plurality of audio signals assigned to the first adaptive filter, and a first coefficient from the set of coefficients for the first adaptive filter; and produce and echo cancelled microphone signals using the first audio signal and the first coefficient of the first adaptive filter.

Further still, one or more computer readable storage media is provided encoded with software comprising computer executable instructions and when the software is executed operable to cause a processor to: receive a speaker signal that is used to produce audio in a room; obtain a plurality of audio signals derived from a plurality of microphones in the room; associate a plurality of adaptive filters to a corresponding plurality of subspaces in the room, wherein each of the adaptive filters is associated with one subspace; assign each of the plurality of audio signals to at least one of the associated adaptive filters; iteratively determine a set of coefficients for a first adaptive filter associated with a first subspace by adapting the first adaptive filter to remove an acoustic echo from each of the audio signals assigned to the first adaptive filter; select a first audio signal from the plurality of audio signals assigned to the first adaptive filter, and a first coefficient from the set of coefficients for the first adaptive filter; and produce and echo cancelled microphone signals using the first audio signal and the first coefficient of the first adaptive filter.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
    receiving a speaker signal that is used to produce audio in a room;
    obtaining a plurality of audio signals derived from an array of microphones in the room;
    associating a plurality of adaptive filters to a corresponding plurality of subspaces in the room, wherein each of the adaptive filters is associated with one subspace;
    assigning each of the plurality of audio signals to at least one of the associated adaptive filters;
    iteratively determining a set of coefficients for a first adaptive filter associated with a first subspace by adapting the first adaptive filter to remove an acoustic echo from each of the audio signals assigned to the first adaptive filter;
    selecting a first audio signal from the plurality of audio signals assigned to the first adaptive filter, and a first coefficient from the set of coefficients for the first adaptive filter;
    producing an echo cancelled microphone signal using the first audio signal and the first coefficient of the first adaptive filter;
    monitoring the performance of at least one other audio signal with the first coefficient, wherein the at least one other audio signal is assigned to a second adaptive filter associated with a second subspace; and
    based on the monitored performance, re-assigning the at least one other audio signal to the first adaptive filter.

2. The method of claim 1, wherein the second subspace is physically adjacent to the first subspace.

3. The method of claim 1, wherein each coefficient in the set of coefficients comprises a plurality of weighted coefficients.

4. The method of claim 1, wherein the plurality of audio signals comprises a plurality of audio beams and a plurality of individual microphone signals.

5. The method of claim 4, wherein the plurality of audio beams are derived by summing signals from at least two microphones from the array of microphones with at least one relative delay between the at least two microphones from the array of microphones.

6. The method of claim 1, further comprising selecting, in at least one further iteration, a second audio signal, wherein the second audio signal was not used to determine the first coefficient; and
    producing the echo cancelled microphone signal using the second audio signal and the first coefficient of the first adaptive filter.

7. An apparatus comprising:
    at least one speaker configured to produce audio in a room from a speaker signal;
    a microphone array comprising a plurality of microphones configured to capture audio, the captured audio comprising an echo of the audio produced by the at least one speaker; and
    a processor coupled to the at least one speaker and microphone array, and configured to:
        receive the speaker signal;
        obtain a plurality of audio signals derived from the microphone array;
        associate a plurality of adaptive filters to a corresponding plurality of subspaces in the room, wherein each of the adaptive filters is associated with one subspace;
        assign each of the plurality of audio signals to at least one of the associated adaptive filters;
        iteratively determine a set of coefficients for a first adaptive filter associated with a first subspace by adapting the first adaptive filter to remove an acoustic echo from each of the audio signals assigned to the first adaptive filter;

select a first audio signal from the plurality of audio signals assigned to the first adaptive filter, and a first coefficient from the set of coefficients for the first adaptive filter;

produce an echo cancelled microphone signal using the first audio signal and the first coefficient of the first adaptive filter;

monitor the performance of at least one other audio signal with the first coefficient, wherein the at least one other audio signal is assigned to a second adaptive filter associated with a second subspace; and based on the monitored performance, re-assign the at least one other audio signal to the first adaptive filter.

8. The apparatus of claim 7, wherein the second subspace is physically adjacent to the first subspace.

9. The apparatus of claim 7, wherein each coefficient in the set of coefficients comprises a plurality of weighted coefficients.

10. The apparatus of claim 7, wherein the plurality of audio signals comprises a plurality of audio beams and a plurality of individual microphone signals.

11. The apparatus of claim 10, wherein the processor is configured to derive the plurality of audio beams by summing signals from at least two microphones from the plurality of microphones with at least one relative delay between the at least two microphones from the plurality of microphones.

12. The apparatus of claim 7, wherein the processor is further configured to:

select, in at least one further iteration, a second audio signal, wherein the second audio signal was not used to determine the first coefficient; and produce the echo cancelled microphone signal using the second audio signal and the first coefficient of the first adaptive filter.

13. One or more non-transitory computer readable storage media encoded with software comprising computer executable instructions and when the software is executed operable to cause a processor to:

receive a speaker signal that is used to produce audio in a room;

obtain a plurality of audio signals derived from a plurality of microphones in the room;

associate a plurality of adaptive filters to a corresponding plurality of subspaces in the room, wherein each of the adaptive filters is associated with one subspace;

assign each of the plurality of audio signals to at least one of the associated adaptive filters;

iteratively determine a set of coefficients for a first adaptive filter associated with a first subspace by adapting the first adaptive filter to remove an acoustic echo from each of the audio signals assigned to the first adaptive filter;

select a first audio signal from the plurality of audio signals assigned to the first adaptive filter, and a first coefficient from the set of coefficients for the first adaptive filter;

produce an echo cancelled microphone signal using the first audio signal and the first coefficient of the first adaptive filter;

monitor the performance of at least one other audio signal with the first coefficient, wherein the at least one other audio signal is assigned to a second adaptive filter associated with a second subspace; and based on the monitored performance, re-assign the at least one other audio signal to the first adaptive filter.

14. The computer readable storage media of claim 13, wherein the second subspace is physically adjacent to the first subspace.

15. The computer readable storage media of claim 13, wherein each coefficient in the set of coefficients comprises a plurality of weighted coefficients.

16. The computer readable storage media of claim 13, wherein the plurality of audio signals comprises a plurality of audio beams and a plurality of individual microphone signals.

17. The computer readable storage media of claim 16, wherein the computer executable instructions cause the processor to derive the plurality of audio beams by summing signals from at least two microphones from the plurality of microphones with at least one relative delay between the at least two microphones from the plurality of microphones.

18. The computer readable storage media of claim 13, further comprising instructions that cause the processor to:

select in at least on further iteration a second audio signal, wherein the second audio signal was not used to determine the first coefficient; and produce the echo cancelled microphone signal using the second audio signal and the first coefficient of the first adaptive filter.

* * * * *